UNITED STATES PATENT OFFICE.

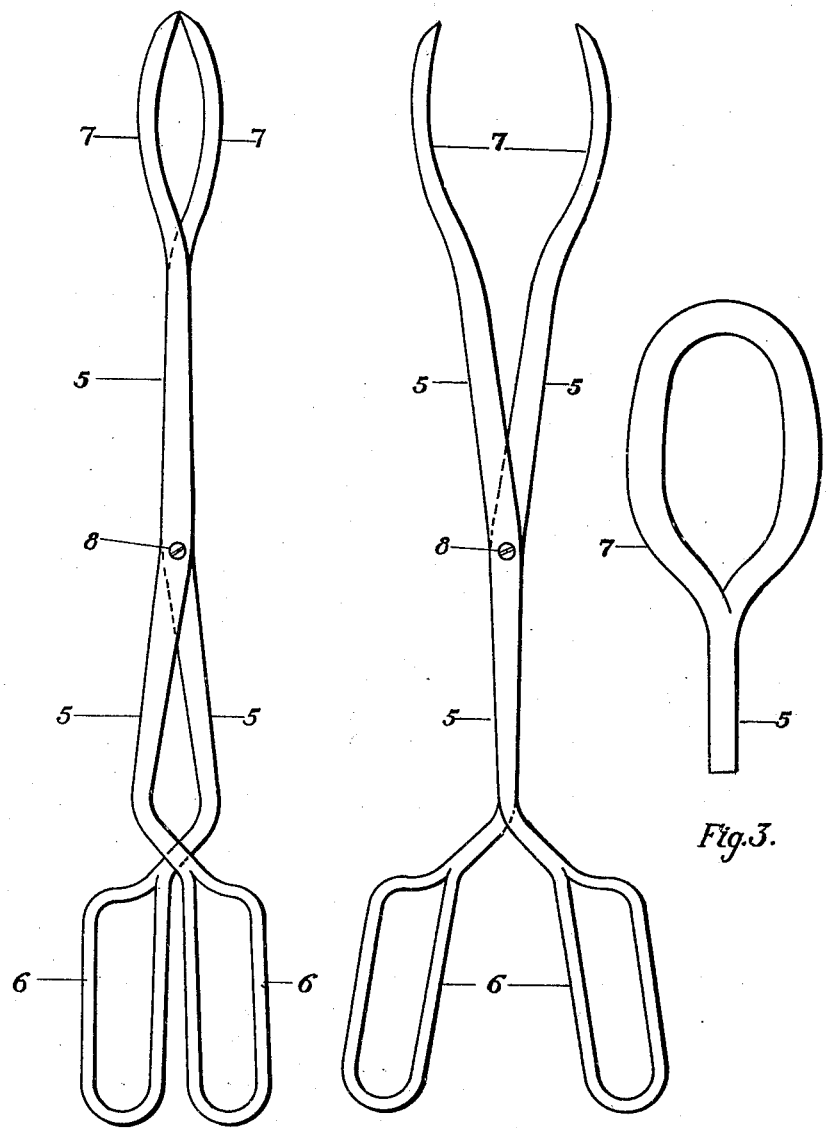

CLIFTON L. WHITTINGTON, OF ELDORA, IOWA.

OBSTETRICAL FORCEPS.

1,322,382.  Specification of Letters Patent.  Patented Nov. 18, 1919.

Application filed July 17, 1919. Serial No. 311,451.

*To all whom it may concern:*

Be it known that I, CLIFTON L. WHITTINGTON, a citizen of the United States, residing at Eldora, in the county of Hardin and State of Iowa, have invented new and useful Improvements in Obstetrical Forceps, of which the following is a specification.

This invention relates to obstetrical forceps designed primarily for veterinary use, although it is not limited thereto, the device embodying certain novel features which adapts it for general use.

The invention has for its object to provide an implement of the kind stated having a pair of crossed and pivotally connected shanks carrying spoon-shaped gripping jaws at their outer ends, the shanks being so curved that they offer a minimum amount of obstruction when the jaws are in closed or in spread positions.

Other objects and advantages of the invention will be pointed out in the detailed description appearing hereinafter, and in order that the invention may be better understood, reference is had to the accompanying drawing forming a part of this specification.

In the drawing,

Figure 1 is a side elevation of the implement showing the jaws thereof closed;

Fig. 2 is a similar view showing the jaws spread, and

Fig. 3 is a front elevation of one of the jaws.

Referring specifically to the drawing, 5 denotes two crossed and pivotally connected shanks having handle loops 6 at one end, and jaws 7 at their opposite ends, these parts being all integral. The pivotal connection is shown at 8, the same being made by a rivet or any other suitable means. The jaws 7 are so positioned relative to each other that they are directly opposite, and they are in skeleton form as usual. The jaws are also dished or spoon-shaped to obtain a better hold.

The shanks 5 are not straight but they are bent out of alinement on opposite sides of the pivot or fulcrum 8. The bends are such that when the jaws 7 are closed, the portions of the shanks beyond the pivot and up to the jaws lie closely together and overlap, whereas on the other side of the pivot, the shanks converge from the handle loops 6 in the direction of the pivot. When the jaws 7 are spread, the shanks extend convergingly from the jaws toward the pivot, whereas between the latter and the handle loop they lie closely together and overlap. Figs. 1 and 2 clearly illustrate these two positions of the shanks. In the first described position of the shanks shown in Fig. 1 they offer a minimum amount of obstruction and permit complete and ready penetration, and when the jaws are spread and in gripping position as shown in Fig. 2, the shanks again offer a minimum amount of obstruction, and permit ready withdrawal. The two shanks and their jaws are counterparts, and hence the implement can be used as a left or a right-handed implement. The shape of the shanks also brings the handle loops 6 so closely together that the implement can be used with one hand.

I claim:

1. An obstetrical forceps comprising a pair of crossed and pivotally connected shanks having jaws at one end and hand grips at the other end, said shanks being out of alinement on opposite sides of the pivot, so that the shanks overlap between the pivot and the jaws, and converge toward the pivot from the hand grips when the jaws are closed, whereas when the jaws are spread, said shanks converge from the jaws to the pivot and overlap between the pivot and the hand grips.

2. An obstetrical forceps comprising a pair of crossed and pivotally connected shanks having spoon-shaped jaws at one end and hand grips at the other end, said shanks being out of alinement on opposite sides of the pivot, so that the shanks overlap between the pivot and the jaws, and converge toward the pivot from the hand grips when the jaws are closed, whereas when the jaws are spread, said shanks converge from the jaws to the pivot and overlap between the pivot and the hand grips.

In testimony whereof I affix my signature.

CLIFTON L. WHITTINGTON.